Figure 1:
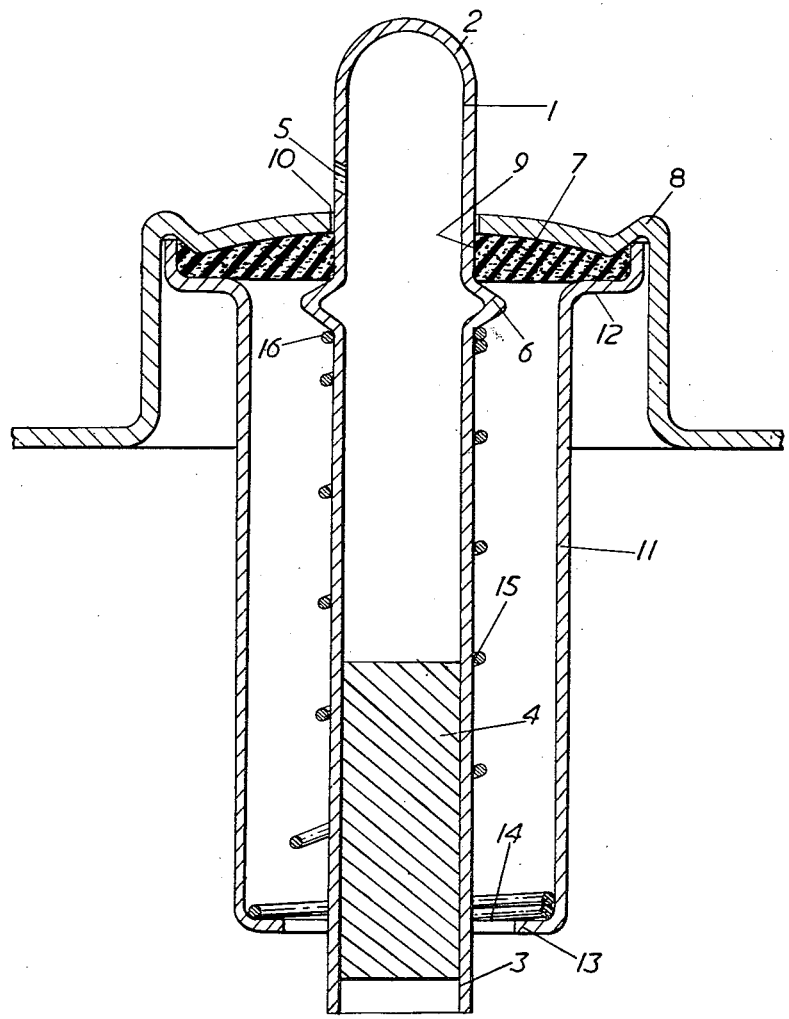

Aug. 14, 1962    A. GAWTHROP    3,049,269
DISPENSING DEVICES
Filed March 24, 1958    2 Sheets-Sheet 1

Alan GAWTHROP
*Inventor*

By Wenderoth, Lind & Ponack
*Attorneys*

3,049,269
DISPENSING DEVICES
Alan Gawthrop, Birstall, Leicester, England, assignor to Rexall Drug and Chemical Company (U.K.) Limited, a British company
Filed Mar. 24, 1958, Ser. No. 723,455
Claims priority, application Great Britain Mar. 26, 1957
4 Claims. (Cl. 222—307)

This invention is for improvements in or relating to dispensing devices and is particularly concerned to provide a valve for dispensing accurately measured doses of liquid from a container in which the liquid is stored under pressure.

Various liquids are stored under pressure for dispensing in the form of sprays, commonly referred to as aerosols. These aerosols are of widely differing characters ranging from cosmetic preparations through insecticides, lathers and pharmaceutical preparations.

In the dispensing of certain of these aerosols, particularly those of a pharmaceutical character, it becomes desirable to be able to dispense accurately measured doses although this is not so important in connection with cosmetic preparations.

Measuring valves have already been provided in which there is disposed within the closure member for a container a measuring tank through which moves a valve stem which is provided with orifices. On depression of the valve stem, liquid contained in the measuring tank may be dispensed through the valve stem.

One object of the present invention is to provide a simplified dispensing device for accurately measured doses of liquid. Another object is to provide a construction which will make possible the accurate measuring of smaller doses than is practicable by the use of a dispensing device involving a measuring tank.

According to the present invention, there is provided a device for dispensing accurately measured doses of liquid from a container comprising a hollow cylindrical member, closed at each end to form a liquid receptacle of predetermined volume. The cylindrical member is formed with a single orifice in a side wall at a point adjacent one end thereof, and said cylindrical member is mounted to reciprocate through a sealing member in a closure member for a container. The cylindrical member is provided with an abutment thereon adapted to engage with the inner surface of said sealing member and so disposed that said orifice is uncovered in the outermost position of said cylindrical member. The extent of reciprocation is at least sufficient to allow said orifice to pass through and beyond said sealing member; preferably, said cylindrical member is spring-urged to the outermost position.

With the dispensing device of the present invention, it will be appreciated that the predetermined volume of the interior of the hollow cylindrical member can be accurately adjusted to almost any desired amount. This may conveniently be done in one embodiment of the invention by inserting a plug or the like into the open end of the tubular member, which is closed at its other end. The positioning of the plug within the tube predetermines the volume of liquid which will be dispensed at each reciprocation of the tube member, which constitutes the hollow cylindrical member above referred to.

A feature of the invention consists in that the sealing member is clamped in position in the closure member by means of an open cylindrical member, which provides at the end remote from the sealing member a guide for said cylindrical member. A coil spring may conveniently be disposed within the open cylindrical member to exert the desired spring-pressure for maintaining the hollow cylindrical member at its outermost position.

The construction of the present invention is greatly simplified, as compared with prior constructions of dispensing devices, and requires only a single seal since there is only a single valve orifice in the cylindrical member. This orifice functions both as the inlet for filling the interior of the cylindrical member with the desired volume of liquid, and as the outlet for the liquid so measured.

Another advantage possessed by the construction of the present invention is that it greatly facilitates the filling of containers. By depressing the hollow cylindrical member so that it is wholly within the container, by means of a probe or a filling tube, the liquid to be inserted into the container can readily and speedily be introduced in contrast with prior arrangements where the filling operation was tedious.

Various arrangements may be employed for guiding the hollow cylindrical member during its reciprocation. For example a star washer may be located within the open cylindrical member above referred to or, alternatively, a spring may be employed which, over at least a part of its length, is in sliding engagement with the outer surface of the hollow cylindrical member, thereby constituting a guide. The guiding means should also prevent sideways displacement of the hollow cylindrical member when depressed within the container during filling.

The construction of the present invention relies upon a single seal. Since aerosol liquids are always under pressure in the container, the internal pressure within the container always ensures a tight seal between the sealing member and the closure member, on the one hand, and the hollow cylindrical member, on the other hand.

It will be appreciated that the hollow cylindrical member is, itself, a measuring chamber and renders unnecessary the provision of a separate measuring chamber.

Figure 2:
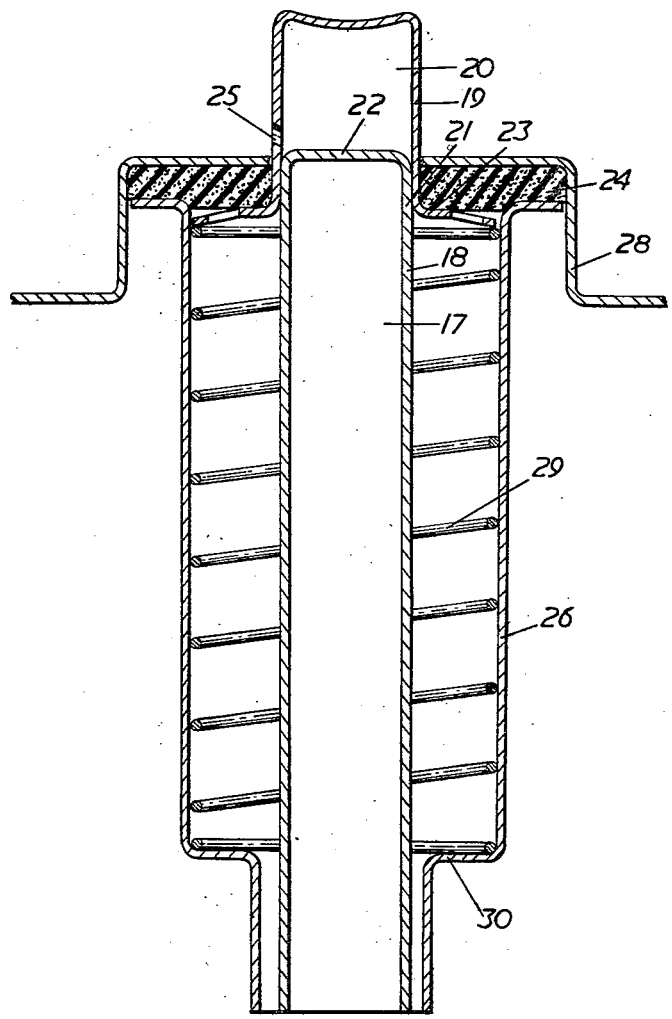

The invention will now be described with reference to the accompanying drawings in which FIGURE 1 is a cross-section of one construction in accordance with the invention and FIGURE 2 is a cross-section of an alternative construction in accordance with the invention.

In the construction illustrated in FIGURE 1, there is provided a tube 1 closed at one end 2, the other end 3 being closed by means of a plug 4. The position of the plug is adjustable in order to pre-set the free space within the tube 1 to measure a required volume of liquid. Near to the closed end 2 of the tube, there is formed a small orifice 5. Between that orifice and the open end 3 of the tube, there is formed a circumferentially enlarged portion 6 of the tube 1 which acts as an abutment to limit the movement of the tube in the outward direction by engagement with the sealing member 7. The sealing member 7 is constituted by a rubber or other elastic sealing material which is disposed within the end of a closure member 8 for a container (not shown). The sealing member 7 and the closure member 8 are provided with holes 9, 10, which are in register, of a size such that the tube 1, which constitutes the valve stem, may reciprocate.

The sealing member 7 is secured in position within the closure member 8 by means of an elongated open cylindrical member 11. Member 11 is formed with a flange 12 at one end, which presses the sealing member 7 into engagement with the inner surface of the closure member 8 and is itself retained in position in the closure member by crimping or any other convenient method of securing.

At the other end, the open cylindrical member is formed with an inturned flange 13 on which rests the end 14 of a coil spring 15. The other end 16 of the spring 15 engages with the circumferentially enlarged portion 6 of the tube 1, i.e., the valve stem. The positioning of the above-mentioned orifice 5 in relation to the circumferentially enlarged portion 6 of the tube 1 is such that, when the tube is in its outermost position (as seen in FIGURE 1), the orifice 5 is in communication with the open atmosphere. The orifice is disposed sufficiently far from the outermost end of the tube so that, on depression by means of a finger, the tube 1 can be moved into the container through the sealing member 7 to an extent sufficient to uncover the orifice 5 so as to place it in communication with the interior of the container. Liquid within the container can be raised to a point at which it will fill the interior of the tube 1 through the orifice 5 when the tube is in the depressed position by means of a dip tube. Alternatively, the filling of the interior of the tube can be more simply effected by using the device in the inverted position.

The upper convolutions of the spring 15 surround the tube and constitute a guide therefor.

In the alternative construction illustrated in FIGURE 2, the valve 17 is formed in two parts constituted by tubes 18, 19. These tubes are of slightly differing external diameter, such that one 18 is a tight fit within the open end of the other 19.

In this arrangement, the measuring chamber 20 within the valve 17 is formed in a short length of tube 19 by closing the open end 21 thereof with the closed end 22 of a length of tube 18, which length of tube 18 is open at the other end. If the tube 18 is reversed, it would provide, without other change in the parts involved, a greatly increased measured volume of liquid for dispensing.

The short length of tube 19 is formed with an outturned flange 23 at its open end which constitutes the abutment for engagement with the sealing member 24. As in the construction previously described in relation to FIGURE 1, the orifice 25 is so positioned in relation to the out-turned flange 23 as to be in communication with the atmosphere when the flange 23 abuts against the sealing member 24. As in the construction illustrated in FIGURE 1, the valve 17 is disposed within an open ended cylindrical member 26 which at one end has a flange 27 which is crimped or otherwise secured to the closure member 28 of a container (not shown) so as to clamp the sealing member 24 in position. The valve 17 is urged to the outermost position by a spring 29 which rests against a reduced section 30 of the member 26.

The operation of the dispensing device illustrated in FIGURE 2, is the same as that of the construction illustrated in FIGURE 1.

The dispensing device of the present invention may be employed for any composition which is self-propellant either by reason of being or containing a liquefied gas or by containing a gas dissolved therein under pressure. The device is also applicable for the dispensing of creams or lathers which contain gas under pressure, as well as other liquids which are sprayed or emitted as liquids or finely-divided solids suspended in a liquefied gas.

I claim:

1. A metered dosage valve device for dispensing accurately measured doses of liquid under pressure from a container comprising a hollow cylindrical member, closed at each end to form a liquid measuring chamber of predetermined volume, a side wall of said hollow cylindrical member being formed with a single orifice at a point adjacent one end thereof, said orifice being the only opening in said hollow cylindrical member, said hollow cylindrical member being mounted to reciprocate through a resilient sealing member clamped in a closure member for a container and having an abutment thereon for engagement with the inner surface of said sealing member and so disposed that said orifice is uncovered in the outermost position of said hollow cylindrical member, the extent of reciprocation being at least sufficient to allow said orifice to pass through and beyond said sealing member, said sealing member being clamped in position in the closure member by means of an open cylindrical member of a diameter greater than said hollow closed cylindrical member providing a passage for liquid therebetween which open cylindrical member is of reduced diameter to form an inwardly directed flange at the end remote from the sealing member to constitute a guide for said hollow cylindrical member and a coil spring enclosed within said open cylindrical member to engage with said inwardly directed flange and with the abutment on said hollow cylindrical member to urge it to its outermost position.

2. A device according to claim 1 wherein the coil spring disposed within said open cylindrical member is over at least a part of its length in sliding engagement with the outer surface of said hollow cylindrical member to constitute a guide therefor.

3. A device according to claim 1 and an axially adjustable plug in said hollow cylindrical member closing the end thereof remote from said orifice.

4. A device according to claim 1 wherein said hollow cylindrical member is formed from two interfitting tubular members each closed at one end and of diameters such that one tubular member is reversibly engageable in the open end of the other tubular member in liquid-tight manner.

References Cited in the file of this patent

UNITED STATES PATENTS

| | | |
|---|---|---|
| 1,062,576 | Baskett et al. | May 20, 1913 |
| 1,326,053 | Henry | Dec. 23, 1919 |
| 1,388,192 | Olney | Aug. 23, 1921 |
| 2,801,031 | Hunter | July 30, 1957 |
| 2,835,417 | Kiraly | May 20, 1958 |
| 2,837,249 | Meshberg | June 3, 1958 |
| 2,932,432 | Beard | Apr. 12, 1960 |